Aug. 31, 1965  L. G. HORWITT ETAL  3,203,246
BLOW-OFF VALVE AND PRESSURE INDICATOR FOR FIRE EXTINGUISHERS
Filed April 13, 1962  2 Sheets-Sheet 2

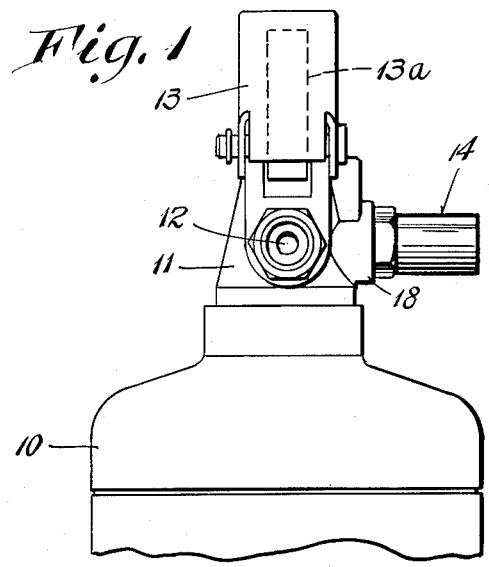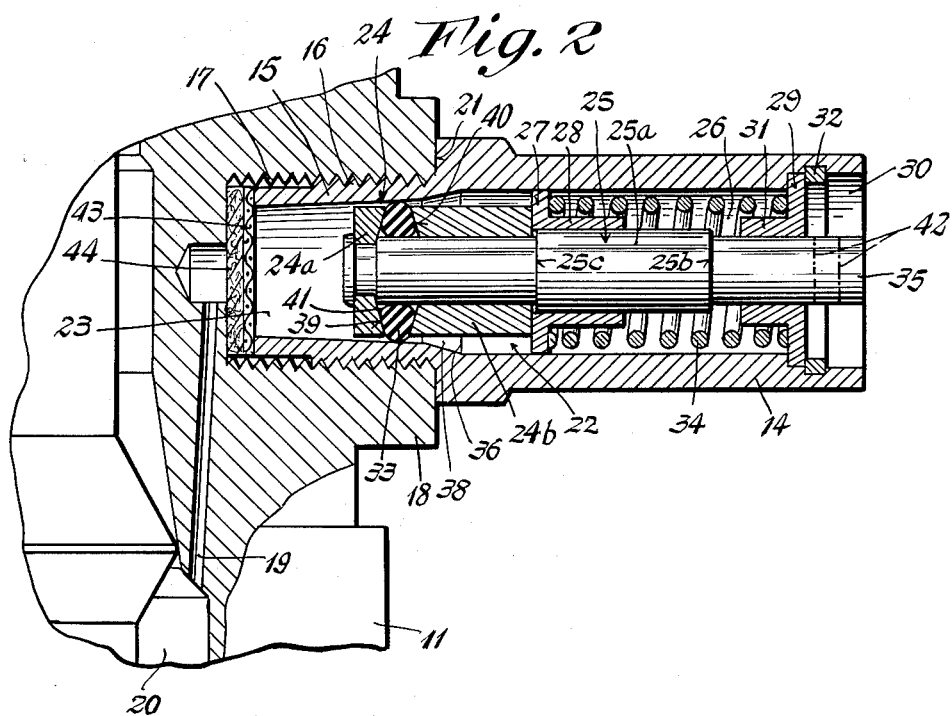

INVENTORS
Laurence G. Horwitt
Philip M. Carter
Roman Gurtler
BY Johnson and Kline
ATTORNEYS _United States Patent Office_ 3,203,246
Patented Aug. 31, 1965

3,203,246
BLOW-OFF VALVE AND PRESSURE INDICATOR
FOR FIRE EXTINGUISHERS
Laurence G. Horwitt, New Haven, Conn., and Philip M. Carter, Ossining, and Roman Gurtler, Chester, N.Y., assignors to The Casco Products Corporation, Bridgeport, Conn., a corporation of Connecticut
Filed Apr. 13, 1962, Ser. No. 187,370
3 Claims. (Cl. 73—419)

This invention relates to pressure gauges and more particularly to gauges which are particularly useful when incorporated in fire extinguishers and other pressurized bottles and containers to indicate the amount of expellant fluid pressure therein or lack of sufficient pressure.

In one form of satisfactory and reliable fire extinguishers a container or tank is supplied with powder which is ejected from a nozzle toward the source of fire, to extinguish, or smother it, by a gas under pressure in a tank when a valve is opened for the purpose. The utility of such fire extinguishers, in fact the operativeness thereof, depends on the tank containing sufficient gas pressure to expel the fire extinguishing material and propel it to the source of the fire.

Notwithstanding that when shipped out by the manufacturer the tank contains gas under prescribed pressure, in the course of time the expelling gas may and sometimes does leak out of the tank to such an extent that when the extinguisher is needed there is insufficient pressure to expel the extinguishing material.

The possibility of this occurring is so great, considering that the extinguishers may stand idle for extremely long periods of time, that such devices are unreliable unless they are provided with a gauge which indicates the gas pressure actually in the tank at all times, so that if the gas or other fluid falls below a predetermined safe pressure, the fact can be observed upon periodic inspection and the extinguishers can be replaced or refilled if defective.

Heretofore, for this purpose, fire extinguishers have been provided with pressure gauges having a diaphragm or other expandable member operating a pointer or hand with a dial marked off in pounds, for instance.

Such gauges are quite expensive and being more or less delicate are liable to physical damage, or inherent failure to operate for instance by becoming stuck or "frozen" in the one position in which they have stood for a long period of time. Should the gauge become stuck, there is no way of determining the fault and thus full reliance cannot be placed on such devices.

It is an object of the present invention to provide a pressure gauge for fire extinguishers which may be checked both visually and tactably, thereby permitting the pressure in the tank or lack of it to be determined at any time in the dark as well as in the light.

It is another object of the present invention to provide a pressure gauge which may be more economically manufactured than the diaphragm or Bourdon tube types pointer and dial gauges and which is more rugged and resistant to physical damage, corrosion or other effects of the atmosphere than gauges heretofore used or proposed.

In filling the tank of the fire extinguisher to a predetermined desired maximum, the pressure may inadvertently exceed a safe limit for the strength of the device or the parts thereof, in which case the device may be damaged. The same damaging results may occur when the tank is subjected to excessive heat even though the pressure was within safe limits at the time of filling the the tank.

It is an object of the present invention to provide as a unit a simple and convenient pressure gauge and blow-off valve which will allow sufficient gas to escape from the tank should excessive pressure be present in or be built up in the tank so that the pressure may be reduced to the safe maximum value whereupon the valve will close automatically and hold the gas at said reduced pressure in the tank.

The objects of this invention are obtained by the provision of a housing mounted in the tank having a cylindrical bore in communication with the interior of the tank and containing a spring loaded piston. The piston has a piston rod which may extend through a hole in the housing more or less (depending on the gas pressure applied to the piston) where it can be observed and also can be touched by a person's finger. The loading spring is calibrated to permit the end of the piston rod to recede from its normal position when the gas pressure in the tank and the gauge drops below a certain minimum operable value.

The fact that the end of the piston rod may be touched by the operator's finger permits the operator to move the piston inwardly against the pressure of the gas and thus determine whether or not the piston is frozen in a position in which it has remained for a long period of time.

According to this invention, when the pressure in the tank and cylinder becomes dangerously excessive, the piston is moved against the pressure of the spring to a position in the cylinder at which the bore is larger than the effective diameter of the piston, thereby allowing gas to escape past the piston to the exterior of the housing until the pressure drops to a safe value, whereupon the spring causes the piston to again engage the walls of the cylinder and prevents the further escape of gas, but still indicating the pressure of the gas remaining in the tank.

Other features and advantages will hereinafter appear.

In the accompanying drawings:

FIGURE 1 is a fragmentary side elevation of the upper end of a conventional fire extinguisher with the pressure gauge and blow-off valve device of the present invention attached thereto.

FIG. 2 is a longitudinal section showing the piston and indicator rod in the position which they occupy in the housing when the gas pressure in the tank is sufficient for efficient use.

Figure 3:
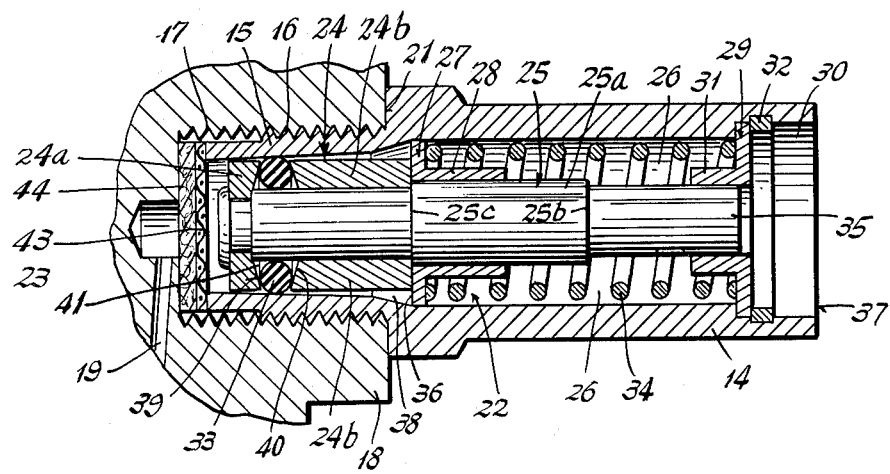
FIG. 3 is a view similar to FIG. 2 showing the piston and indicator rod in the position which they occupy when the gas pressure in the tank is insufficient for effective operation.

In FIG. 1 there is shown, by way of example, the upper portion of a fire extinguisher of the type having a tank 10 which may contain dry fire extinguishing or smothering powder and also a quantity of gas under pressure which functions to propel the powdered material from the tank through a valve body 11 and nozzle 12 when a lever 13 is operated.

The tank must be filled with care under enough pressure to expel the powder from the nozzle with sufficient force to propel the powder toward and upon the source of the fire to be extinguished until substantially all the powder in the tank has been expelled therethrough and projected to the source of the fire if necessary. However, if it is not necessary to use the entire charge of the tank, the lever 13 may be manually released to be returned by spring 13a and the remaining gas and powder retained in the tank. In either event, the gas pressure in the tank is reduced to some degree, possibly to nil in case the entire charge is used.

The pressure of the gas may also be reduced by leakage of the gas from the tank through the valve and nozzle or otherwise to a degree that would make the extinguisher wholly or partially ineffective for emergent use.

As a result, without something to indicate the presence of sufficient gas pressure in the tank whereby the condition of the extinguisher and its readiness for use can be determined from time to time, reliance cannot be placed on the extinguisher for the use for which it is intended.

To alleviate this situation, it has been common practice to have a pressure gauge having a Bourdon tube or other expansible member on the tank or valve body in communication with the tank to indicate the amount of gas pressure in the tank. However, such pressure gauges are comparatively expensive and subject to malfunctioning due to external causes as by physical damage or internal causes such as leakage or by the parts being immobilized for instance for frozen moisture or corrosion.

Besides, such gauges having a dial and pointer to indicate the pressure can only be checked by observation in the presence of sufficient light and often fire extinguishers are kept in places or positions where there is not sufficient light to permit the gauge to be read.

These difficulties are avoided by the present invention by the substitution for the dial and pointer type gauge of a pressure gauge which is of rugged construction, contains no delicate pivoted parts, and in which the gas pressure in the tank may be determined both visually and tactably.

In the form of the invention illustrated and described by way of example, the gauge of the present invention comprises a housing 14 having a neck 15 provided with screw threads 16 fitting screw threads 17 in a boss-like portion 18 of the valve body 11 which has a passage 19 leading to the interior 20 of the tank. A shoulder 21 on the housing abuts the portion 18 of the body when the housing is tightly screwed in place. The housing 14 has a longitudinal bore 22 therein communicating with the passage 19 to receive gas under pressure therefrom.

Within an inner portion 23 of the bore 22 there is located a piston 24 having a piston rod 25 extending through the outer portion 26 of the bore 22, the piston and its rod being guided for longitudinal movement in the housing by two disks—a disk 27 slidably engaging the portion 26 of the bore and having a collar 28 carried by the piston rod, and a disk 29 fitting in an enlarged outer end portion 30 of the bore and having a collar 31 forming a bearing for the outer end of the piston rod 25. The disk 29, as shown, is retained in the end portion 30 of the housing by a snap 32.

The piston has an obturating gland 33 which may be in the form of an O-ring which slidably engages the surface of the portion 23 of the bore so as to normally prevent the passage of gas from the portion 23 to the portion 26 of the bore, but causing the piston 24 to be moved outwardly of the bore in response to the pressure of the gas in the tank 10.

Within the portion 26 of the bore and located between the disks 27 and 29 is a spring 34 by which the piston is urged toward the inner end of the bore 23, motion being transmitted to the piston by the abutting engagement of the disk 27 therewith.

In the form of the invention shown, the piston 24 has two parts—a head 24a secured to the piston rod and a sleeve 24b slidably mounted on the piston rod 25, the O-ring 33 being located between the adjacent faces of the head 24a and the sleeve 24b.

As manufactured and before gas under pressure is injected into the tank, the parts are in the positions shown in FIG. 3 in which the piston 24 is in its innermost position and the outer end 35 of the piston rod is substantially flush with the disk 29. In this condition, the disk 27 being urged by the spring 34 engages a reduced portion 36 in the bore 23 allowing the head 24a and the sliding collar 24b to be moved apart by the resiliency of the O-ring. When gas pressure is applied to the piston, the latter is moved to the right as shown in FIG. 3 against the resistance of the spring 34. As the pressure increases to the predetermined pressure desired, the piston is moved until its end 35 assumes a predetermined position with relation to the disk 29 and the extreme outer end 37 of the housing. Preferably, the piston is moved to a position where the end 35 of the rod is substantially flush with the end 37 of the housing, as shown in FIG. 2, the proportion of the parts and the tension of the spring 34 being calculated to produce this condition. As gas pressure increases from nil to something less than minimum usable pressure, the force of the spring 34 causes the sleeve 24b to be slid toward the head 24a of the piston with the result that the O-ring is firmly gripped between the head 24a and the sliding sleeve 24b and is both prevented from twisting and also is forced to expand against the wall of the portion 23 of the bore.

Figure 4:
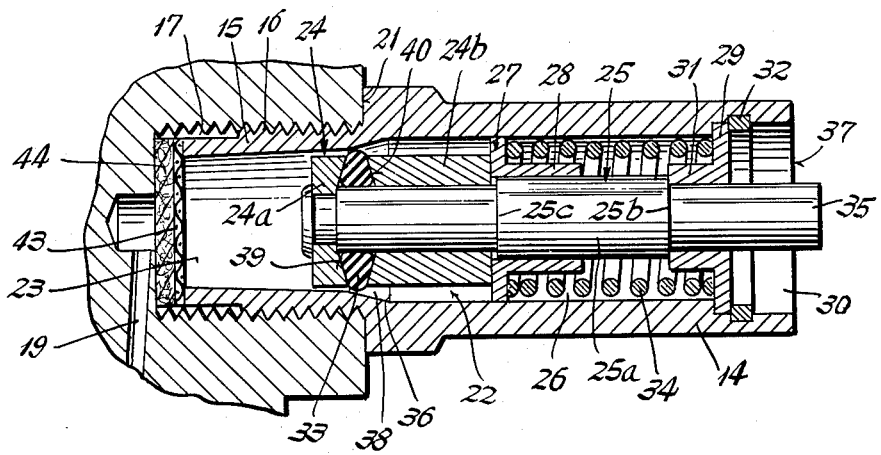
FIG. 4 is a view like FIGS. 2 and 3 but showing the position of the piston and rod when the pressure in the tank is excessive, the propelled gas escaping past the piston to the exterior of the housing.

When the gas pressure in the tank increases beyond the predetermined maximum indicated by the position of the end 35 of the piston rod as shown in FIG. 4, the gland 33 on the piston will be moved out of the portion 23 of the bore into an enlarged portion 38 where the gland is out of engagement with the wall of the bore (see FIG. 4), allowing the gas to escape past the gland into the portion 26 of the bore and past the disks 27 and 29, neither of which makes an airtight fit with their engaging parts of the housing, and into atmosphere. This escape of the gas will continue until the pressure of the gas is reduced to a predetermined maximum whereupon the spring 34 overcomes the pressure of the gas and forces the gland 33 back into the portion 23 of the bore to prevent further escape of the gas.

The extent of movement of the gland 33 into the enlarged portion 38 depends somewhat upon the cause of the excess pressure in the tank, and therefore the position of the piston in FIG. 4 should be taken as representative of one possible condition. For instance, if the excess pressure is caused by gradual heating of the tank, as by the heat of the sun, the piston would be moved rather gradually so that when the gland 33 is just barely out of contact with the wall of the portion 23 of the bore, the gas will bleed past the gland, the gas having little, if any, kinetic energy to move the piston. However, if the excess gas pressure is caused by inadvertent or inattentive filling of the tank with gas, so that a substantial stream of gas impinges on the piston, the latter will move into the enlarged portion 38 of the bore, possibly to the position shown in FIG. 4.

When the gas pressure in the tank drops to a maximum safe range, reentry of the bland 33 into the portion 23 of the bore is facilitated by the wall in the portion 38 preferably tapering down gradually from the larger portion 26 to the smaller portion 23.

One of the important features of this invention is the provision of means whereby the user may at will and without disassembling any of the parts, test the gauge to determine whether it is functioning. Assuming that the position of the end 35 of the piston rod indicates sufficient pressure for satisfactory operation, the user needs merely to apply finger pressure to the end 35 of the rod, pushing it in against the resistance of the spring 34 and the gas and observing whether or not the rod returns to its starting position. If it does not return, or if the piston cannot be pushed in manually, it would indicate that the piston or rod is "frozen" by corrosion formed between the parts or by frozen moisture therein or for some other cause, and that the gauge was not functioning properly.

While the normal range of operable pressures in the tank may for instance be in the order of from 150 to 190 pounds per square inch, it should be noted that the area of the piston is preferably a great deal less than a square inch, the diameter of the piston being in the order of .250 inch, resulting in manual pressure in the order of 9 to 10 pounds being required on the end of the rod to be overcome in testing the operativeness of the gauge.

A feature of this invention is the provision of means whereby the O-ring 33 is securely held in position against turning or twisting on itself and at the same time is expanded outwardly so as to make good airtight connection with the portion 23 of the bore.

For this purpose, the inner face 39 of the piston head 24a inclines downwardly and inwardly toward the rod 25 and the same is true of the surface 40 of the sliding sleeve 24b, thus forming an inwardly enlarged annular cavity 41 approximately V-shape in cross-section in which the O-ring is positioned and held captive as shown in FIG. 3. In this FIG. 3, it should be noted that the disk 27 has reached the limit of its movement thereby taking the pressure of the spring 34 off the sliding sleeve 24b and that the piston head 24a is spaced from the sliding sleeve 24b. As soon as gas pressure is applied to the piston, the head 24a moves toward the sliding sleeve 24b and the O-ring is deformed to substantially triangular cross-section and forced outwardly of the annular groove 41, for instance to the position shown in FIG. 2 where it has airtight engagement with the wall of the portion 23 of the bore. When the piston moves to the position shown in FIG. 4, for instance, it is relieved from its engagement with the wall of the portion 23 and assumes the shape which it would occupy under the force of the gas and pressure of the spring when it is not in the portion 23 of the bore.

Thus it will be seen that as the gas pressure increases in the housing, the pressure of the O-ring against the portion 23 of the wall of the bore increases. To compensate for this increase without increasing the friction appreciably between the O-ring and the bore, the wall of the portion 23 tapers slightly outwardly.

The outer end of the rod 25 may be provided with annular grooves 42 shown in dotted lines in FIG. 2 or other marks so that the air pressure in the tank may be quantitatively determined. However, this is not necessary since, if the end 35 of the rod is in the position shown in FIG. 2 or FIG. 3 or somewhere between it, it indicates that there is sufficient gas pressure in the tank for successful operation of the extinguisher.

The outer end portion 30 of the housing forms a guard for protecting the end 35 of the rod against damage by being struck by another object. However, when the excess gas is being expelled through the housing 14, the end 35 momentarily extends beyond the end 37 of the portion 30 as shown in FIG. 4, thus indicating to the operator that the excess gas is escaping.

To limit the movement of the piston rod 25 outwardly of the housing 14, the piston rod has a portion 25a of increased diameter forming a shoulder 25b which is adapted to engage and be stopped by the disk 29.

This enlarged portion 25b performs the additional function of limiting the axial movement of the sliding sleeve 24b relative to the piston head 24a, the O-ring 33 and the piston rod 25. A shoulder 25c of the portion 25a engages the end of the sliding sleeve 24b when there is no pressure in the housing as shown in FIG. 3. However, when gas pressure is applied and increased, the pressure on the O-ring will cause the sliding sleeve 24b and the piston rod 25 to move with it. Then the pressure of the spring 34 on the sliding sleeve causes the latter to squeeze the O-ring and force it outwardly against the wall of the bore 23.

When the extinguisher is of the type employing powdered material, it is preferable to provide a filter, such as a screen 43 and a matted pad 44, between the housing and the passage 19 in the tank so as to avoid the powder being blown into the bore of the housing, especially when excess pressure is present in the tank.

While the invention has been described in connection with the gas-filled fire extinguisher with which it has special utility, it should be understood that it may be advantageously used with gas-filled bottles or containers for other purposes, such, for instance, as spraying with insecticides, paints, etc.

It should also be understood that where the term "gas" is used herein, it is intended to include air or other gas, dry or liquified, suitable for expelling and propelling material from a closed container.

Variations and modifications may be made within the scope of the claims and portions of the improvements may be used without others.

We claim:

1. A gauge for use with pressurized fire extinguishers or like devices having a pressurized tank, comprising a cylinder having a bore in communication with the interior of the tank, a piston in the cylinder; a spring engaging the piston yieldingly resisting movement of the piston in response to gas pressure; means connected with the piston to indicate the amount of gas pressure present in the tank, the bore of the cylinder having at one end a diameter larger than that of the piston so that at a predetermined place in the travel of the piston, beyond its normal operating range of movement, to which it is moved when pressure in the cylinder exceeds a predetermined safe value the gas may escape past the piston to the atmosphere, thereby avoiding the creation of excessive pressure which would damage the device said spring returning the piston to normal operating range when the gas pressure in the tank is reduced to a safe value, and and an obturating ring for the piston, said piston being formed of two relatively movable parts, the adjacent faces of which are shaped to and receive said obturating ring, one of said parts being secured to the piston rod and forming the head of the piston and the other of said parts being slidable on said piston rod and urged against said ring by operative engagement with the end of the said spring facing the piston, whereby as the gas pressure against the head of the piston increases the grip upon the ring by the two piston parts increases.

2. A pressure gauge comprising a hollow cylinder open at one end; a piston in the cylinder comprising a piston rod slidably mounted in the cylinder, a head secured to one end of the piston rod, a sleeve slidable on the piston rod and a gland between the adjacent faces of the piston head and the slidable sleeve, the cylinder having a portion of gradually increasing interior diameter from a diameter smaller than the diameter of said gland to a diameter larger than that of said gland so that the gland moves out of contact with the cylinder inner wall at a point in its path of travel; a shoulder on the piston rod to limit movement of the sleeve thereon outwardly of the cylinder; an abutment at the open end of the cylinder forming a bearing for the piston rod; a coil spring in the cylinder between the slidable sleeve and the abutment; and a flanged collar riding on the piston rod and interposed between the sliding sleeve and the adjacent end of the coil spring, the flange of said flanged collar engaging the interior surface of the cylinder to hold the piston rod concentric with the cylinder both before and after the gland moves out of contact with the cylinder wall.

3. A pressure relief valve and gauge for use with pressurized fire extinguishers or like devices having a pressurized tank which must be maintained at a minimum safe operating pressure and from which excessive pressure must be relieved gradually so as not to reduce the pressure in the container below said minimum pressure, comprising a cylinder having a bore in communication with the interior of said tank, a piston movably mounted in the cylinder, said piston having a yieldable gland capable of making an airtight fit with the wall of the bore over a normal operating range of movement of said piston, a spring engaging the piston and yieldingly resisting movement of the piston in response to gas pressure, and means connected with the piston to indicate the amount of gas pressure present in the tank while said piston moves over said range of movement, the bore of the cylinder at one end having a diameter smaller than the normal unstressed diameter of the gland, and at the other end a diameter larger than that of the gland so that at a predetermined place in the travel of the piston, beyond said normal operating range of movement to which it is moved when pressure in the cylinder exceeds a predetermined safe value, the gas may bleed past the piston gland to the atmosphere, thereby avoiding the creation of excessive pressure which would damage the device, the diameter of the bore increasing gradually from said one end to said other end whereby the gas bleeding past the gland of the piston gradually increases in volume as the pressure increases and gradually decrease in volume as the pressure drops toward safe maximum pressure.

References Cited by the Examiner

UNITED STATES PATENTS

| | | | |
|---|---|---|---|
| 23,166 | 3/59 | Gill | 73—419 |
| 177,564 | 5/76 | Rudd | 137—469 |
| 2,570,655 | 10/51 | Druge | 73—389 X |
| 2,686,445 | 8/54 | Keck | 73—389 X |
| 2,690,360 | 9/54 | Young | 73—388 |
| 2,721,575 | 10/55 | Gier et al. | 137—538 X |
| 2,839,265 | 6/58 | Hobbs | 251—191 X |
| 2,948,256 | 8/60 | Tapp | 116—34 |
| 3,068,703 | 12/62 | Morton | 73—419 |

RICHARD C. QUEISSER, *Primary Examiner.*

ROBERT L. EVANS, *Examiner.*